United States Patent
Worth et al.

[11] Patent Number: 6,141,628
[45] Date of Patent: Oct. 31, 2000

[54] PROGRAMMABLE LOGIC CONTROLLER SOFTWARE WITH EMBEDDED CLASS LOGIC AND ALARM/SHUTDOWN FUNCTIONALITY

[75] Inventors: Stephen J. Worth, San Rafael; Michael J. Silva, Benecia, both of Calif.

[73] Assignee: AMOT Controls Corporation, Richmond, Calif.

[21] Appl. No.: 09/093,946

[22] Filed: Jun. 8, 1998

Related U.S. Application Data

[60] Provisional application No. 60/049,155, Jun. 10, 1997.

[51] Int. Cl.[7] .................................................. G05B 19/05
[52] U.S. Cl. ........................... 702/185; 702/123; 702/119; 700/17; 700/18; 700/80
[58] Field of Search ...................................... 702/182, 183, 702/185, 123, 31, 32, 119, 120, 122, 184, 188, FOR 119, FOR 170, FOR 171; 364/528.27, 528.28, 528.29, 528.1, 528.34, 528.36, 582.16, 528.17; 395/500.27–500.29, 500.3, 500.36–500.39, 500.41–500.43; 700/9, 10, 12, 17, 18, 21, 23, 25–27, 52, 78–81, 266

[56] References Cited

U.S. PATENT DOCUMENTS

| | | |
|---|---|---|
| 4,367,414 | 1/1983 | Miller et al. . |
| 4,380,146 | 4/1983 | Yannone et al. . |
| 4,485,794 | 12/1984 | Kimberley et al. ...................... 123/569 |
| 4,851,985 | 7/1989 | Burror et al. ............................ 364/184 |
| 5,289,362 | 2/1994 | Liebl et al. .............................. 364/140 |
| 5,428,555 | 6/1995 | Starkey et al. ...................... 364/551.01 |
| 5,613,115 | 3/1997 | Gihl et al. ................................. 700/18 |
| 5,748,119 | 5/1998 | Ko . |
| 5,764,507 | 6/1998 | Chuo ........................................ 700/12 |
| 5,867,382 | 2/1999 | McLaughlin ............................. 700/17 |
| 5,867,383 | 2/1999 | Jansen ...................................... 700/17 |

*Primary Examiner*—Hal Wachsman
*Attorney, Agent, or Firm*—Fenwick & West, LLP

[57] ABSTRACT

A computer-implemented method and a computer-readable program for designing software applications for execution in a programmable logic controller includes determining whether a physical input is analog or discrete, and responsive to the physical input being analog, inputting a set of analog parameters, and responsive to the physical input being discrete, inputting a set of discrete parameters, and storing the parameters in a user parameter data table. The method includes executing a programmable logic controller application responsive to a set of user-defined parameters, including reading an input, and determining whether the input is in fault, and, responsive to the input being in fault, performing an operation from a group of operations consisting of an alarm and a shutdown.

13 Claims, 10 Drawing Sheets

PROGRAMMABLE LOGIC CONTROLLER SOFTWARE WITH EMBEDDED CLASS LOGIC AND ALARM/SHUTDOWN FUNCTIONALITY

RELATED APPLICATION

This application claims the benefit of U.S. provisional application No. 60/049,155, filed Jun. 10, 1997.

BACKGROUND OF THE INVENTION

1. Technical Field

This invention relates generally to the field of programmable logic controllers, and more particularly, to programmable logic controller software with embedded class logic and alarm/shutdown functionality.

2. Background Art

Programmable logic controllers (PLCs) are used in a wide spectrum of applications from factory automation to waste water treatment plant controls and from chemical process plant control to engine management systems. Each application has a unique program, written to the user's specifications, to control the sequence of events for that particular system.

PLCs operate by gathering information from various sensor inputs (analog and discrete) and processing the data using Relay Ladder Logic, a type of computer program based on Hard Wired Relay Logic. As sensor data is gathered and manipulated by the user program, the PLC sends appropriate output signals to control the operation of the equipment to which it is connected. The result is safer, more efficient operation of the monitored or controlled equipment.

PLCs use discrete inputs and analog inputs (sensors) to supply data to the control application. A discrete input has two states: ON or OFF. Depending on how the input sensor is configured, ON can be the healthy state or OFF may be considered the healthy state.

An analog input is a varying input that monitors, for example, pressure, temperature or flow. Temperatures are usually measured using thermocouples or resistance temperature detectors (RTDs). Analog measurements are usually made using current loops (4–20 mA) or voltage inputs (1–5V).

In control applications, analog inputs will have setpoints which are explicitly defined operational limits for each sensor. When the measured value exceeds (or drops below) the setpoint values, the PLC is programmed to take some action. When these setpoints are critical to the operation of the system, the action is deemed to be an alarm or a shutdown. Under these circumstances the PLC may need to halt operation of the monitored process in a manner controlled by the user program. Both alarms and shutdowns send a message to an operator to indicate that a fault has occurred (such as a light or a text message on a display) in addition to taking the appropriate user programmed action. This process of displaying the existence of an alarm or shutdown is referred to as "annunciation."

Industry-standard class logic is used to determine when an input value is critical to the operation of the equipment and, hence, should be monitored. For example, in an engine application, a low oil level is always considered a fault, while a low oil pressure is not a fault at engine startup, but becomes a fault if it remains low after a specified time has expired. Each class type (A, B, b, C) specifies a different algorithm which determines when an input should be monitored for a fault condition, and every input which can generate an alarm or shutdown is assigned one of these classes. Inputs which should be monitored in some fashion but which are not allowed to generate an alarm or shutdown are assigned no class.

There are a large number of PLCs on the market today which allow the ladder logic program to be written on an external computer and then downloaded to the PLC via a communications port. A complete ladder logic program is referred to as a control application and can consist of hundreds or thousands of lines of code because each detail of the program action must be explicitly manipulated by the programmer in the program code.

As currently implemented, however, ladder logic software requires the programmer to individually include each analog setpoint and each individual discrete input into the ladder logic diagram. If class logic is required, the programmer must write this functionality specifically into the program. Sensor failure logic must also be programmed into the user program, as well as a method of checking sensor operation while the equipment is running (test mode). In addition to requiring a large amount of code to be written to execute the user program, any change in the parameters governing the PLC inputs involves manually updating the user program itself.

If a process were developed that can pre-define these operational parameters and embed their functions, as well as class logic, alarm/shutdown logic, sensor failure and other programming details into the programmable controller without the need for large amounts of user programming, the result will be greatly reduced programming time, reduction of errors and enhanced performance of the PLC.

Accordingly, what is needed is PLC software that applies industry-standard class logic to inputs in a simple and largely transparent way, with no additional requirement for user programming. What is also needed is software that can automatically handle the display and user acknowledgment of alarms and shutdowns. In addition, what is needed is software that automatically adds alarm and shutdown information to the appropriate fault log. Moreover, what is needed is software that extends the use of class logic, normally only applied to physical inputs, to user-programmable states as well. What is also needed is software that integrates sensor failure detection into the class logic alarm/shutdown functionality. Additionally, what is needed is software that allows a class event to produce additional actions beyond the default behavior by providing common alarm and common shutdown status, as well as the status of individual inputs, to the user program. Moreover, what is needed is software that allows the user program to control the enabling and timing of the internal class logic functions. In addition, what is needed is software that allows selected channel sensors to be tested by responding to user-initiated fault entries in the same manner as any other fault without activating the corresponding common alarm or common shutdown contact, thereby preventing the user program from responding to the tested-channel faults as it would to an actual fault. Finally, what is needed is software that allows user display messages to be embedded into special display coils in the ladder logic program, which messages are then displayed when the coil is activated, with no additional programming or message mapping in the PLC or display.

SUMMARY OF THE INVENTION

The present invention addresses one or more of the foregoing problems by providing programmable logic controller software with embedded class logic and alarm/ shutdown functionality. A primary objective of the present invention is to provide a simpler approach for designing PLC applications where class logic, alarm/shutdown logic, sensor failure logic and input test logic are required. Thus, the present invention can reduce the user programming required to implement this logic from hundreds of rungs in the traditional PLC implementation down to a small handful of rungs. This represents a great reduction in programming effort and potential for programmer error, and makes the resulting smaller program much easier to maintain and understand.

The foregoing is accomplished by having the bulk of the logic performed transparently to the user program. This transparent, embedded operation (referred to as the "embedded alarm/shutdown logic") requires only that the user enter the appropriate parameters for each channel via convenient data entry screens in the programming software, and activate any necessary class enable coils and class timer coils in the user program. The user may also choose to have the user program respond to special contacts which indicate the presence of an alarm or shutdown, in order to perform necessary actions beyond those embedded in the embedded functionality. By comparison, in traditional ladder logic to achieve the same functionality, the user program must explicitly perform the following actions for each analog input:

a) Determine input type;
b) Perform sensor failure calculations based on input type;
c) Perform desired action on sensor failure;
d) Perform input scaling based on input type and user scaling values;
e) Compare scaled value to one or more setpoints;
f) Perform class logic on all setpoint comparisons;
g) Perform alarm/shutdown logic on all fault inputs; and
h) Enable sensor testing in Test Mode.

Similar programming must be included for each discrete input and each user alarm/shutdown input.

By reducing most of the input functionality to a simple data-entry task rather than a complex programming problem, the present invention greatly accelerates the generation of user programs, as well as significantly reducing the cost of its development. Thus, the programmer may concentrate on producing the desired functionality rather than becoming mired in the cumbersome, repetitive detail of programming embedded alarm/shutdown logic for dozens of inputs.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Definitions a) User Program—A ladder logic program written to the user's specifications which causes the PLC to perform monitoring and controlling functions.

b) Discrete input—An input which can only take one of two values, such as a switch. These inputs can be used transparently in the embedded alarm/shutdown logic and/or explicitly in the user program. Discrete inputs are physical inputs. They are also often called digital inputs.

c) Analog input—An input which can take on a continuous range of values, such as, for example, values related to pressure, temperature, or flow. A sensor converts these values to a voltage, current or other electrical quantity that can be read by the PLC. These inputs can be used transparently in the embedded alarm/shutdown logic and/or explicitly in the user program. Analog inputs are physical inputs.

d) Output—A discrete or analog output used to drive an indicator or control actuator, such as an indicating lamp, a relay or a valve position solenoid.

e) Contact—A ladder logic term for any discrete logical value which is read by the user program and which may take one of two possible states. Some examples are a switch (Open/Closed), a timer status (Running/Not running), or the state of an analog input (Above a setpoint/Not above a setpoint). The user program sets various output coils (see below) based on the state of the contacts in the program.

f) Coil—A ladder logic term for any discrete logical value which is set by the user program to one of two possible states. Some examples are a relay (Energized/Not energized), a timer (Enabled/Not enabled), or a user display message (Displayed/Not displayed).

g) Rung—The smallest component of a ladder logic program, which takes one or more physical and/or logical contacts and produces an active or inactive result based upon the contact states and the user-programmed logical connections between the contacts. This result is passed to all the coils on the rung.

h) Healthy—The state of a physical input or logical input (the state of a user alarm/shutdown coil) which indicates that the input is considered to be within normal limits.

i) Unhealthy—The state of a physical or logical input which indicates that the input is considered to be outside of normal limits, requiring user notification and possible corrective action by the operator and/or user program.

j) Setpoint—An analog value entered by the user indicating the high or low limit at which an analog input is considered healthy. Should the analog input exceed (go above for a HIGH setpoint, or go below for a LOW setpoint) the setpoint, an unhealthy condition exists.

k) Monitored—The condition of a physical or logical input, determined by its class, whereby if the input is unhealthy, then an alarm or shutdown, as selected by the user (one of the user parameters for that input), will be generated. An input which is unhealthy but not monitored will not generate an alarm or shutdown, nor will an input which is monitored but not unhealthy.

l) In Fault—A physical or logical input is considered in fault when it is both unhealthy and monitored.

m) Class Logic—The method used to determine when a given input should be monitored for faults. An input may be assigned to one of the following classes:
Class A The input is always monitored for faults (See FIG. 7).
Class B The input is monitored for faults when the B class has been enabled, and when either the input has gone healthy or when the B timer has timed out, whichever occurs first (See FIG. 8).
Class b The input is monitored for faults when the b ("little b") class has been enabled and when the b timer has timed out (See FIG. 9).
Class C The input is monitored for faults when the C class has been enabled and when the input has gone healthy (See FIG. 10).
NONE The input is never monitored for faults. Its value may still be used by the user program for other purposes.

n) Class timer—A separate timer for each of the classes B and b, which is started by the user program by activating the timer coil and times out after a period entered by the user. The class timer is used in the class logic for class B and class b inputs.

o) Class enable—A coil for each of the classes B, b and C, which must be enabled in the user program before inputs of these classes can be monitored for faults.

p) Alarm—A fault condition which should be communicated to the user but which is not considered critical enough to halt the operation of the monitored or controlled equipment. Since an alarm does not halt the equipment more than one alarm may be active at the same time.

q) Shutdown—A fault condition which is considered critical enough that it should halt the operation of the monitored or controlled equipment in addition to being communicated to the user. While the equipment is being shut down no further shutdowns are detected since they would serve no purpose.

r) Alarm Stack—If the system detects a series of alarms, each alarm is placed on the alarm stack in the order detected. The oldest alarm is displayed to the user until it is acknowledged by the user (whether the input is still unhealthy or not), after which the next oldest alarm is displayed, until all alarms have been acknowledged.

s) User Alarm/Shutdown—A ladder logic coil which can be placed anywhere in the user's program, and which subjects the logical results of the rung on which it is placed to the same class and alarm/shutdown logic as a physical input. Thus the user can define an arbitrary logical condition and monitor it for an alarm or shutdown. A user alarm/shutdown is a logical, rather than physical, input to the embedded alarm/shutdown logic. An example would be if an alarm must be generated only if two discrete inputs are both unhealthy. The user program would place the two discrete inputs on a rung in the proper ladder logic format to drive a user alarm/shutdown coil only if they are both unhealthy.

t) Common Alarm Contact—A contact available to the user program that indicates that one or more alarm inputs is currently unhealthy, whether these alarms have been acknowledged by the user or not. This contact might the used to drive a remote indicator to inform the operator that the monitored process is outside of nominal limits.

u) Common Shutdown Contact—A contact available to the user program that indicates that a shutdown has been detected and the input is still unhealthy. This contact would normally be used to enable the shutdown logic in the user program in order to bring the process or equipment to a halt until the condition causing the shutdown can be made healthy again.

v) Fault Log—Each alarm or shutdown is recorded in the appropriate fault log contained in nonvolatile memory. Included in the fault log entry are the description of the input, the input value at the time of the fault, and the time and date of the fault. The fault logs are circular in nature so that when a log is full then the next entry into that log overwrites the oldest entry.

w) Sensor Failure—A type of fault which indicates that the input sensor or circuitry has failed and the readings obtained on that input are no longer valid.

x) Test Mode—A mode which can be applied for a limited time to one or more inputs, in which the input can be placed into a fault state and trigger the class logic functionality without being reflected in the Common Alarm/Common Shutdown contacts. This allows testing of the sensor without causing the user program to actually perform its alarm or shutdown actions. Test mode will end either when the user pushes a reset key or when the test mode timer times out. While in test mode, all binary inputs reflect their non-fault state to the user program, and all other inputs reflect their last value, before test mode began, to the user program.

y) Program Cycle—The period during which all inputs are read by the Controller, the appropriate class logic is applied to them, the user program is run, and all outputs are updated based on the results of the user program. This cycle is repeated often enough to provide a monitor/control response adequate for the device(s) being monitored and/or controlled.

z) User Display Coil—A special coil which has a display message associated with it (the message is a user parameter for the user display coil). When the coil is activated in the ladder logic program the message is automatically displayed on the PLC display. In one embodiment, messages can display runtime values via embedded codes.

System Architecture

In a preferred embodiment, the present invention is implemented as software components of a conventional personal computer such as an IBM® PC or compatible, although one skilled in the art will recognize that other implementations are possible. For example, the present In invention could be implemented in an embedded system. In accordance with the present invention, a central processing unit (CPU) such as an Intel® Pentium® processor is provided, which executes software instructions and interacts with other components to perform the methods of the present invention. The software instructions are preferably stored in a standard memory unit such as a random access memory (RAM) and/or in a mass storage unit such as a is hard disk drive.

A user interacts with the system via an input device, such as a mouse or keyboard. A display device is also provided, which is preferably a cathode-ray tube (CRT) for the display of text and/or graphics under the control of the CPU. Additionally, a communication port is provided for transferring a ladder logic program from the personal computer to a custom programmable logic controller (PLC). In an alternative embodiment, a conventional PLC could be used.

Preferably, the analog and discrete signals to be monitored are connected to the appropriate inputs of the custom PLC, and the devices to be controlled are connected to the appropriate PLC outputs. Thereafter, the user program containing the logical and analog sequence steps as well as the required parameters, is downloaded into the PLC.

Operation

Among the user parameters downloaded to the PLC are those which govern the inputs to the embedded alarm/shutdown logic. Therefore, referring now to FIG. 1, there is shown a flow diagram for inputting 101 user parameters for the physical inputs in accordance with the present invention. Initially, a determination 102 is made whether the current input is analog or discrete. If the input is discrete, the method continues at step 113; otherwise, the method continues by inputting 103 the class type for the current analog input. Preferably, the class type is either A, 3B, b, C, or NONE, as described in the definitions above.

Figure 1:
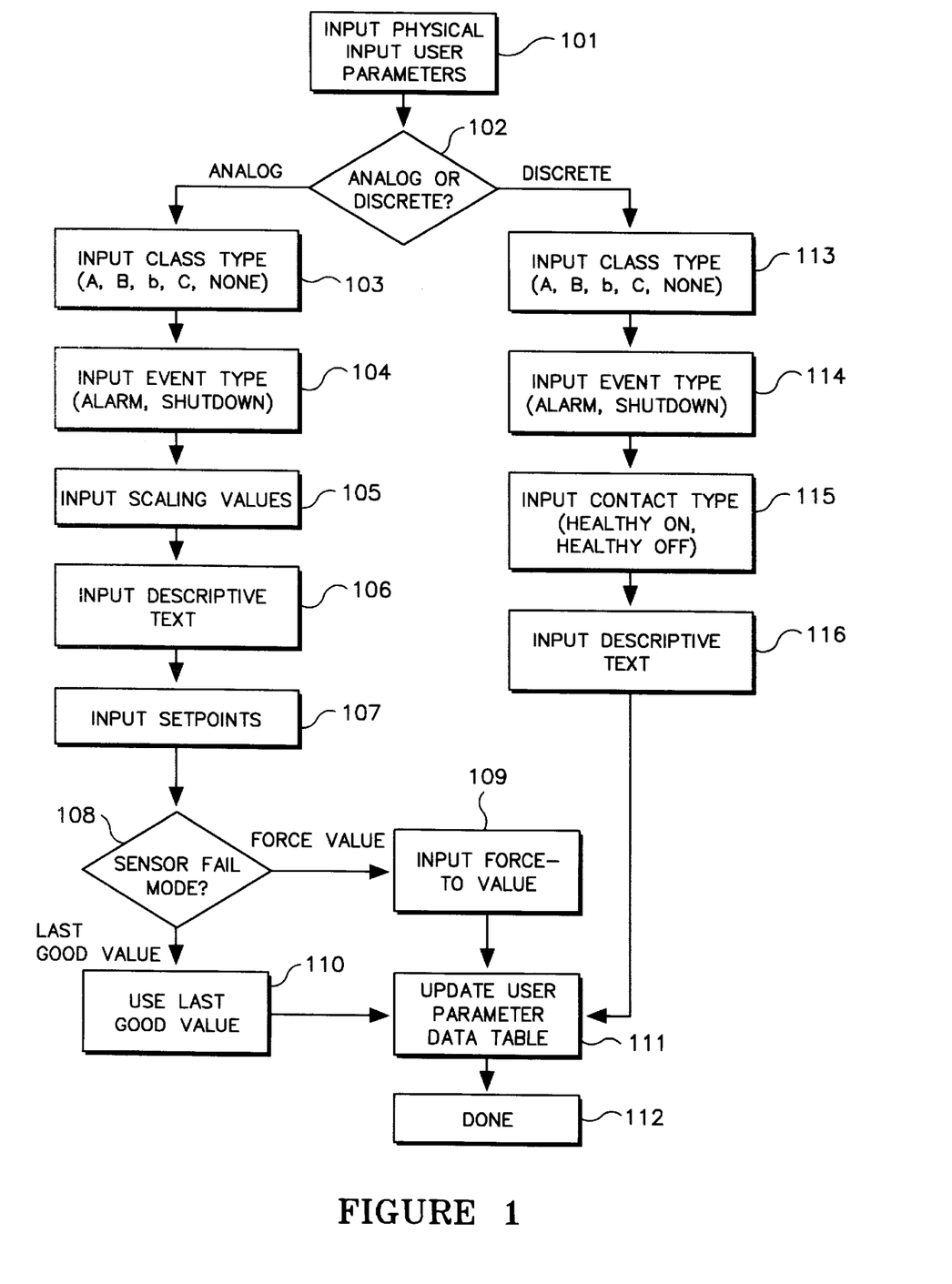
FIG. 1 is a flow diagram for inputting user parameters for the physical inputs in accordance with the present invention.

Thereafter, the method continues by inputting 104 the event type. In a preferred embodiment, the event type is either an alarm or a shutdown. As noted earlier, an alarm is a fault condition that should be communicated to the user, but is not critical enough to halt the operation of the monitored or controlled equipment. A shutdown, on the other hand, is a fault condition that is critical enough to halt the operation of the monitored or controlled equipment in addition to being communicated to the user.

Next, scaling values are input 105, which are used to scale the actual electrical input signals to numerical values used by the PLC. In addition, a descriptive text is input 106, which is used to identify the particular analog input in fault displays and logging. Thereafter, at least one setpoint is input 107, which indicates the high or low limit at which an analog input is considered healthy. Should the analog input exceed the setpoint (go above for a HIGH setpoint, or go below for a LOW setpoint), an unhealthy condition exists and appropriate action is taken.

Finally, the current sensor fail mode is determined 108. The sensor fail mode indicates what action will be taken in the event of a sensor failure. If the sensor fail mode is "force value," the method continues by inputting 109 the force-to value. If, however, the sensor fail mode is "last good value," the method continues by using 110 the last good value. After the user parameters for the current analog input are entered, the method continues by updating 111 the user parameter data table, after which the method is complete 112.

If, in step 102, the input is found to be discrete (binary), the method continues by inputting 113 the class type for the current discrete input. As is the case with an analog input, the class type of a discrete input is preferably A, B, b, C, or NONE. Thereafter, the event type, either alarm or shutdown, is input 114, as in step 104. Next, the input contact type is input 115, which is used to determine whether the healthy state is "ON" or "OFF" for the particular discrete input. For example, if "ON" is selected as the healthy state, then an "OFIF" condition in the discrete input will be considered unhealthy. If the unhealthy input is subsequently determined by the class logic to be monitored, a fault will be detected.

Finally, a descriptive text is input 116, which is used to identify the particular discrete input, and which is used in fault displays and logging. After the user parameters for the discrete input are obtained, the method continues by updating 110 the user parameter list, and the method is complete 112. One skilled in the art will recognize that the foregoing method may be repeated for each remaining physical input analog or discrete.

Figure 2:
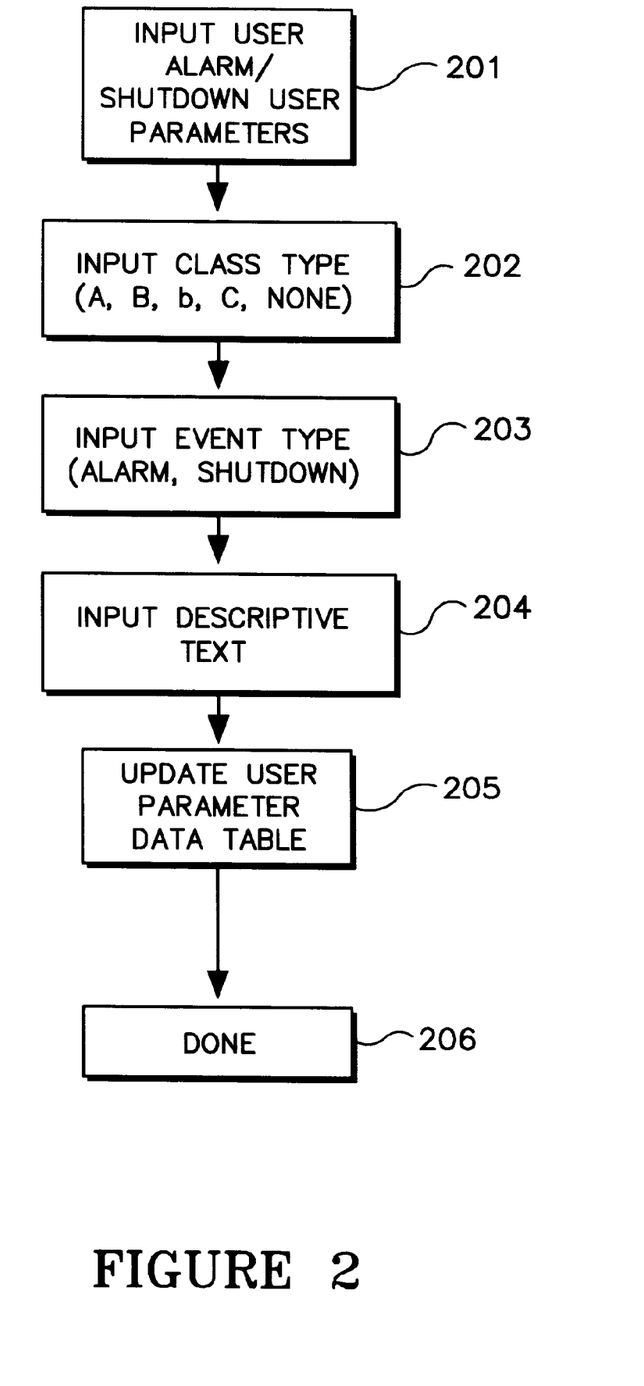
FIG. 2 is a flow diagram for inputting user alarm/ shutdown parameters in accordance with the present invention.

Referring now to FIG. 2, there is shown a flow diagram for inputting 201 user alarm/shutdown parameters in accordance with the present invention. As noted earlier, a user alarm/shutdown is a ladder logic coil which can be placed anywhere in a user program, and which subjects the logical results of the rung on which it is placed to the same class and alarm/shutdown logic as a physical input. As a result, the user can define an arbitrary logical condition and monitor it for an alarm or shutdown.

The method begins by inputting 202 the class type (A, B, b, C, or NONE), followed by inputting 203 the event type (alarm or shutdown). Thereafter, a descriptive text 204 is input 203 and the user parameter table is updated 205 with the new set of user alarm/shutdown parameters, after which the method is complete 206.

Figure 3:
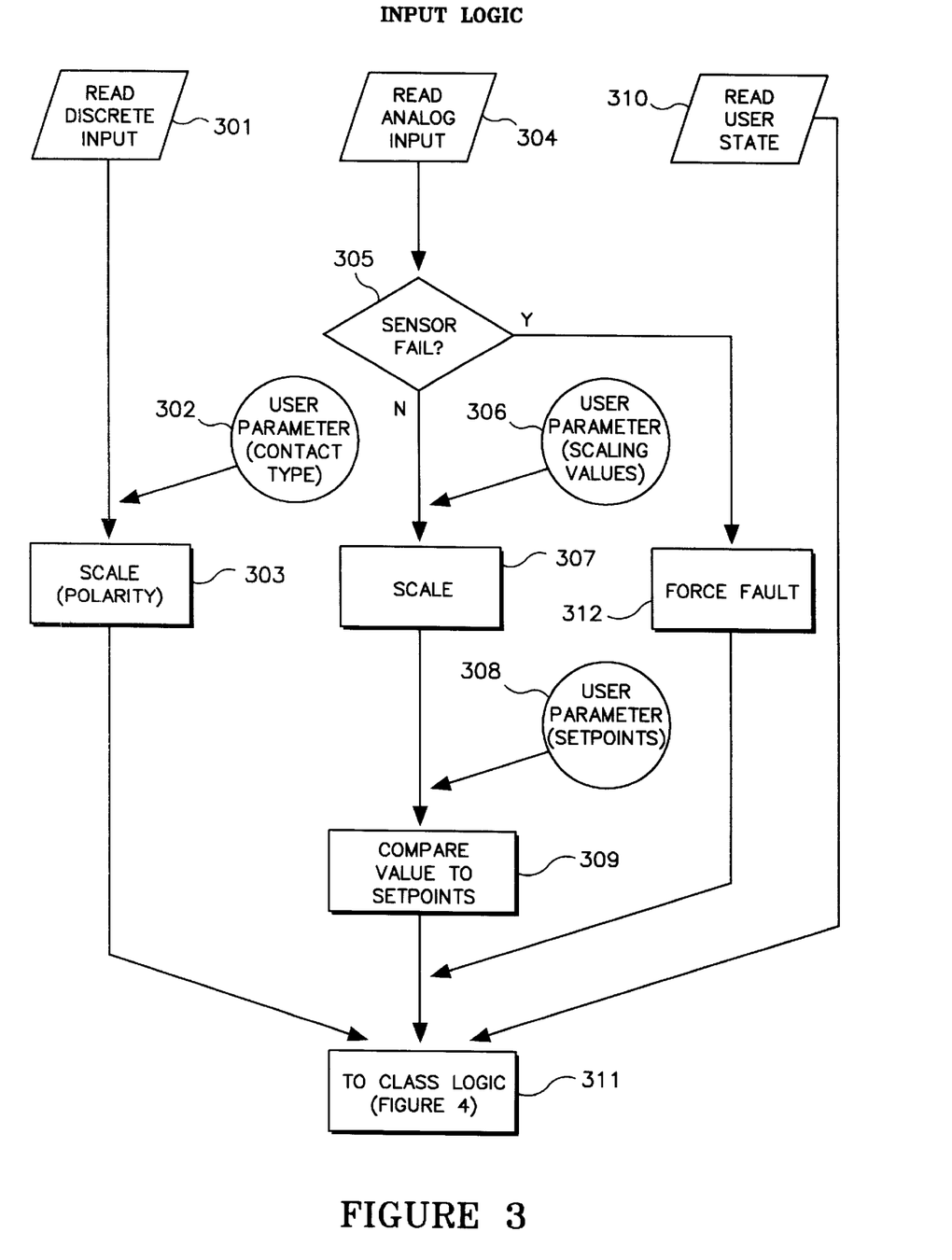
FIG. 3 is a flow diagram of the input logic portion of a program cycle in accordance with the present invention.

Referring now to FIG. 3, there is shown a flow diagram of the input logic portion of a program cycle in accordance with the present invention. A program cycle is the period during which all inputs are read by the PLC, the appropriate class logic is applied, the user program is run, and all outputs are updated. The cycle is repeated often enough to provide a monitor/control response adequate for the device(s) being monitored and/or controlled.

The program cycle begins with the input logic portion, during which the physical inputs are read and converted to logical inputs based upon user-programmable parameters. Each discrete input is read 301, and scaled 303 (assigned normal or reverse polarity) according to the contact type 302 user parameter to convert the raw input state to a healthy/unhealthy state. The contact type 302 was obtained during step 115 and determines whether "ON" or "OFF" is considered the healthy state. Thereafter, the healthy/unhealthy state undergoes class logic processing 311 as described in greater detail in FIG. 4.

In a preferred embodiment, each analog input is also read 304, and checked 305 for sensor failure. Sensor failure determination depends only on the nature of the analog input circuitry in question (e.g. thermocouple or 4–20 mA loop) and is normally outside the control of the user. Thereafter, the analog input is scaled 307 using the scaling values 306 obtained in step 105 to generate a value within the desired range. Scaling is based upon either the particular type of input (e.g. a type J thermocouple), or in the case of a generic voltage or current input the user may supply conversion values (e.g. 4 mA=0 p.s.i., 20 mA=1000 p.s.i.).

Finally, the scaled value is compared 309 against the setpoints 308 obtained in step 107. Setpoints 308 may include one or more of a high and low alarm setpoint and a high and low shutdown setpoint. During step 309, a healthy/unhealthy state is determined with respect to each setpoint 309. Thereafter, each setpoint-related healthy/unhealthy state undergoes class logic processing 311 as described in FIG. 4. Finally, any user alarm/shutdown coil states are read 310 and passed directly to class logic processing 311 without modification.

Figure 4:
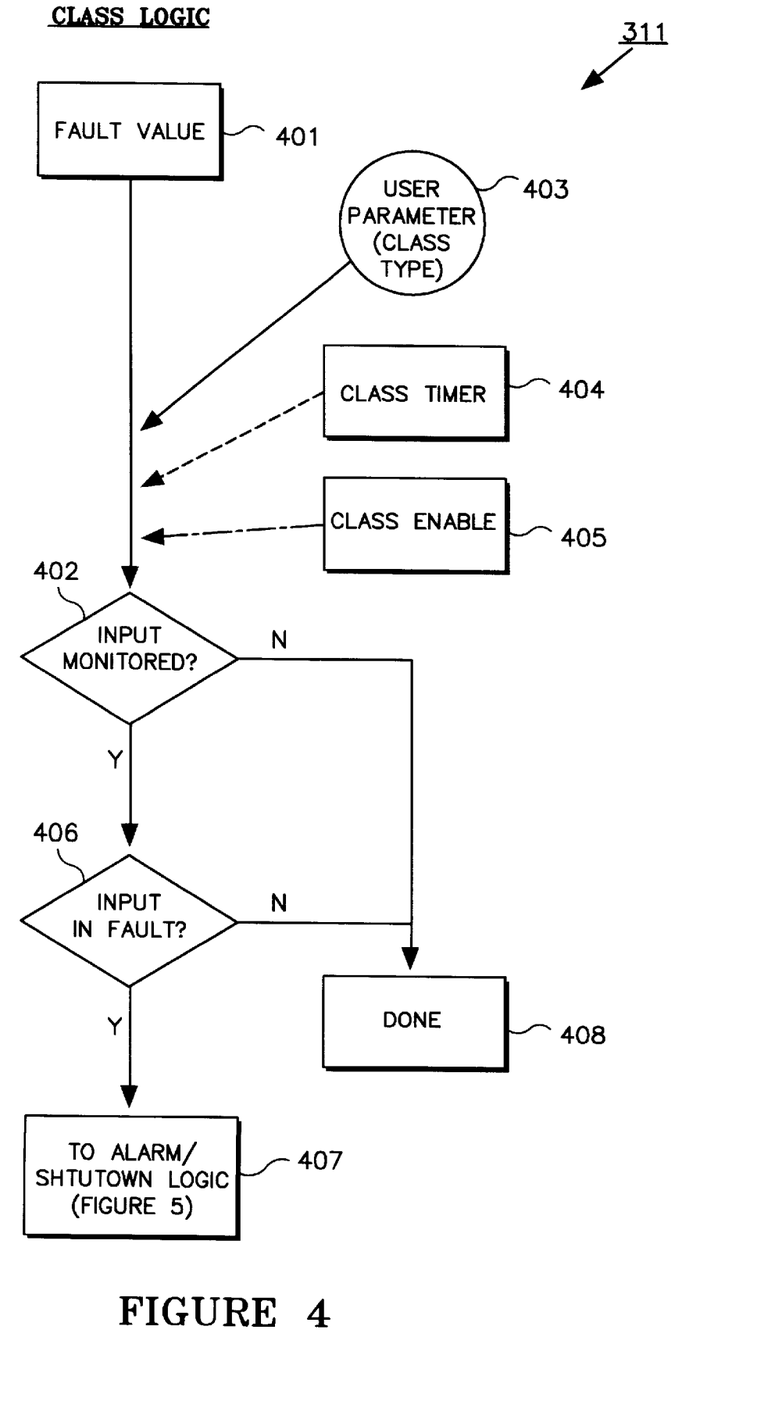
FIG. 4 is a flow diagram of the class logic portion of a program cycle in accordance with the present invention.
Figure 7:
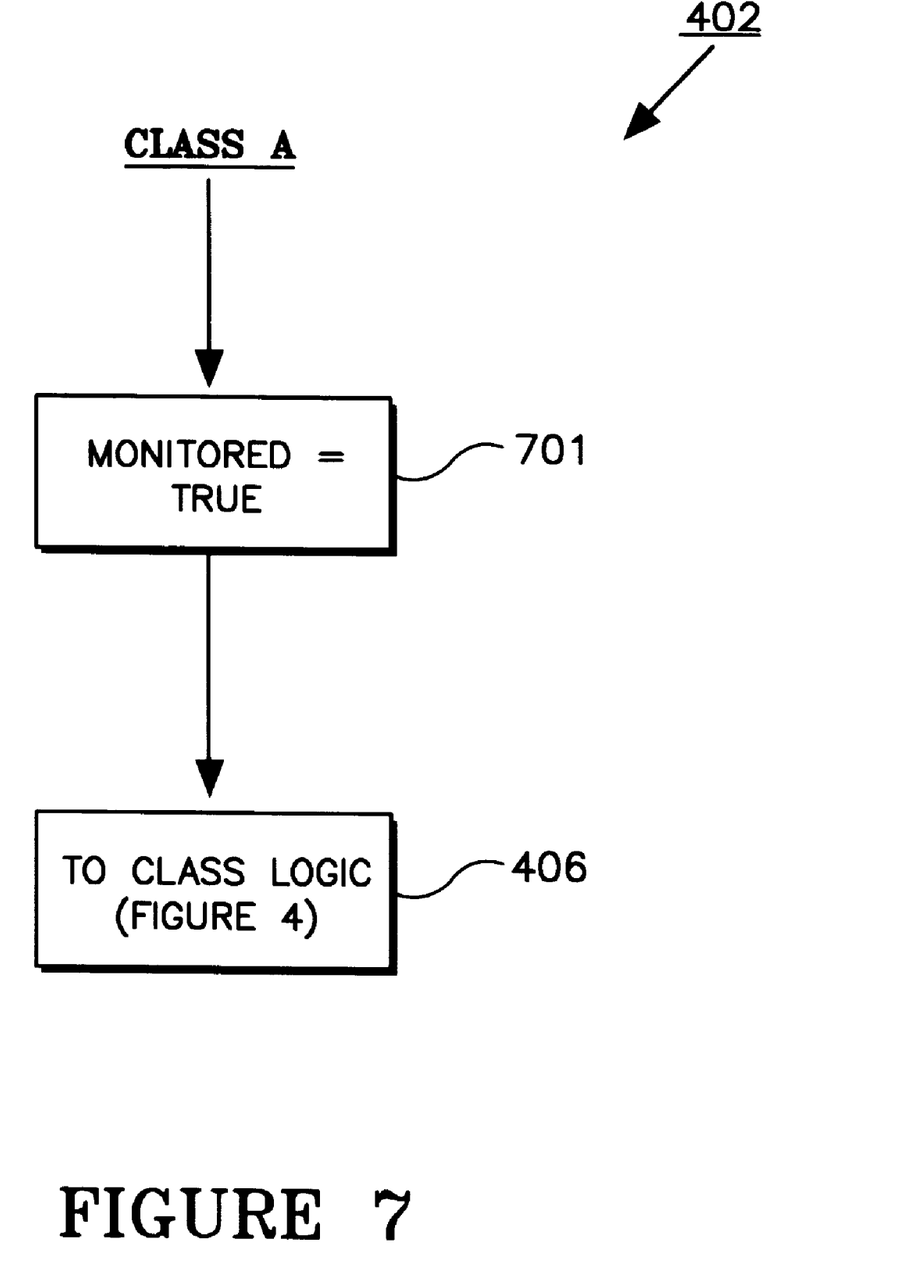
FIG. 7 is a flow diagram of the class logic for a class A input in accordance with the present invention.
Figure 8:
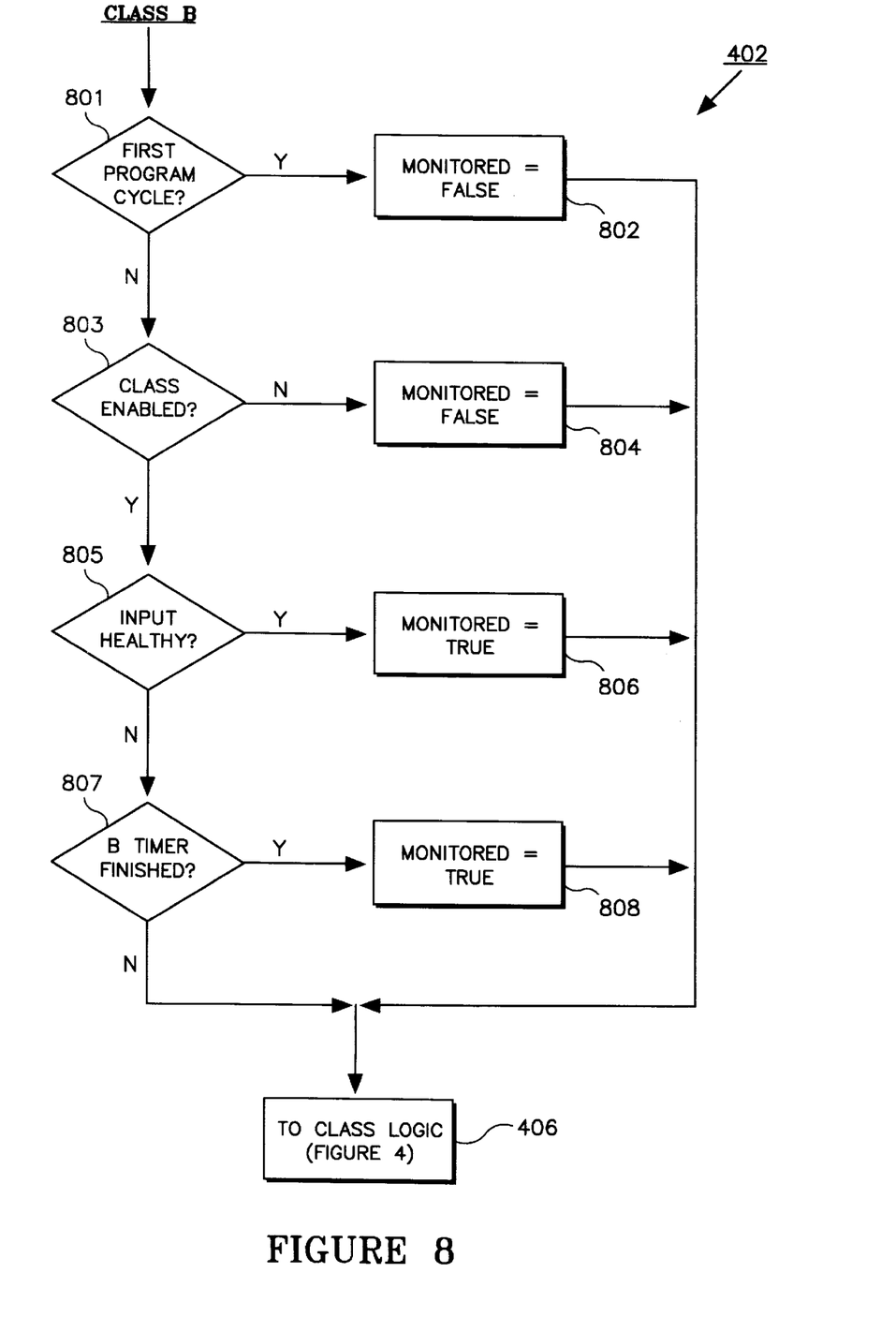
FIG. 8 is a flow diagram of the class logic for a class B input in accordance with the present invention.
Figure 9:
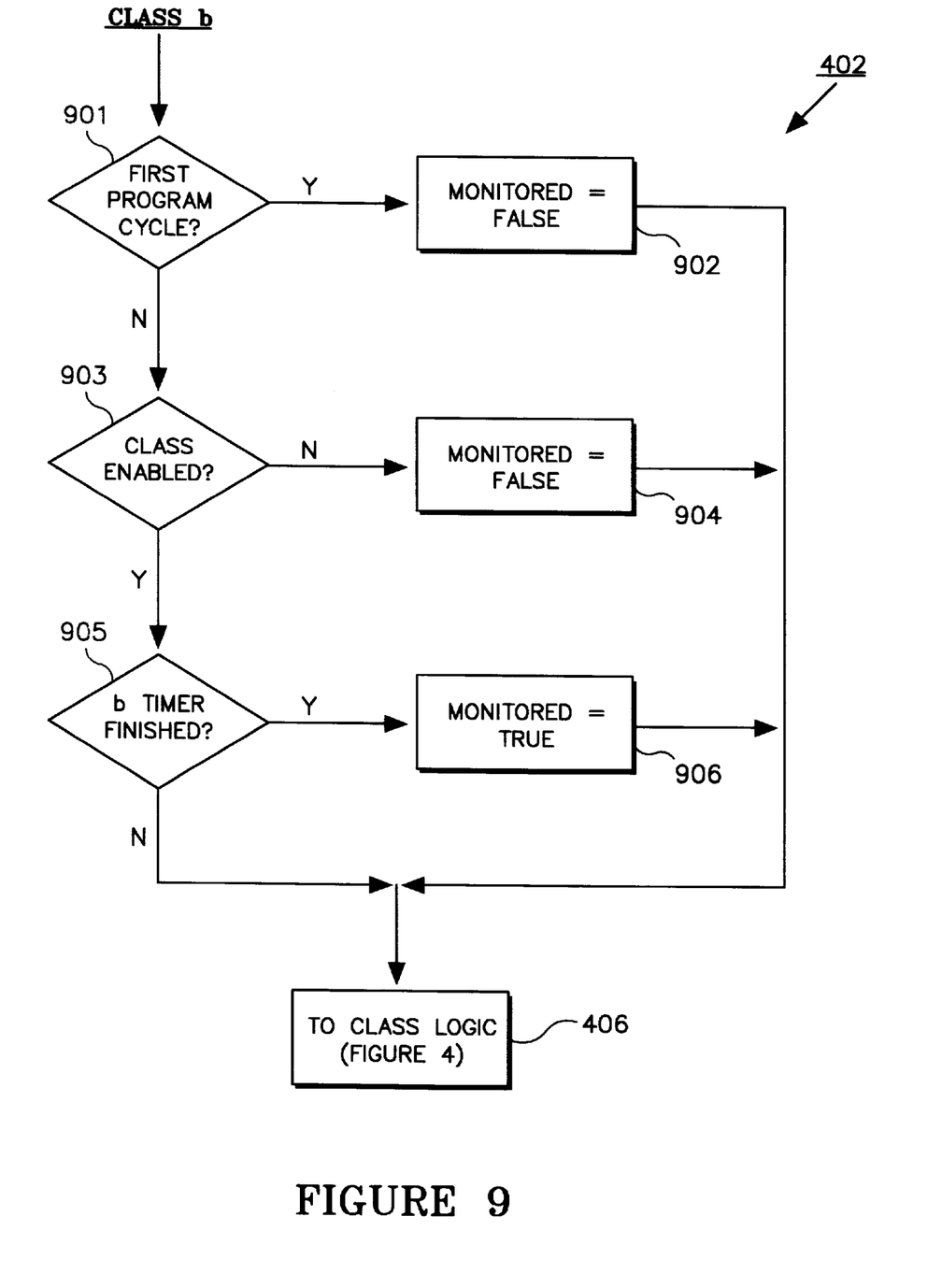
FIG. 9 is a flow diagram of the class logic for a class b input in accordance with the present invention.
Figure 10:
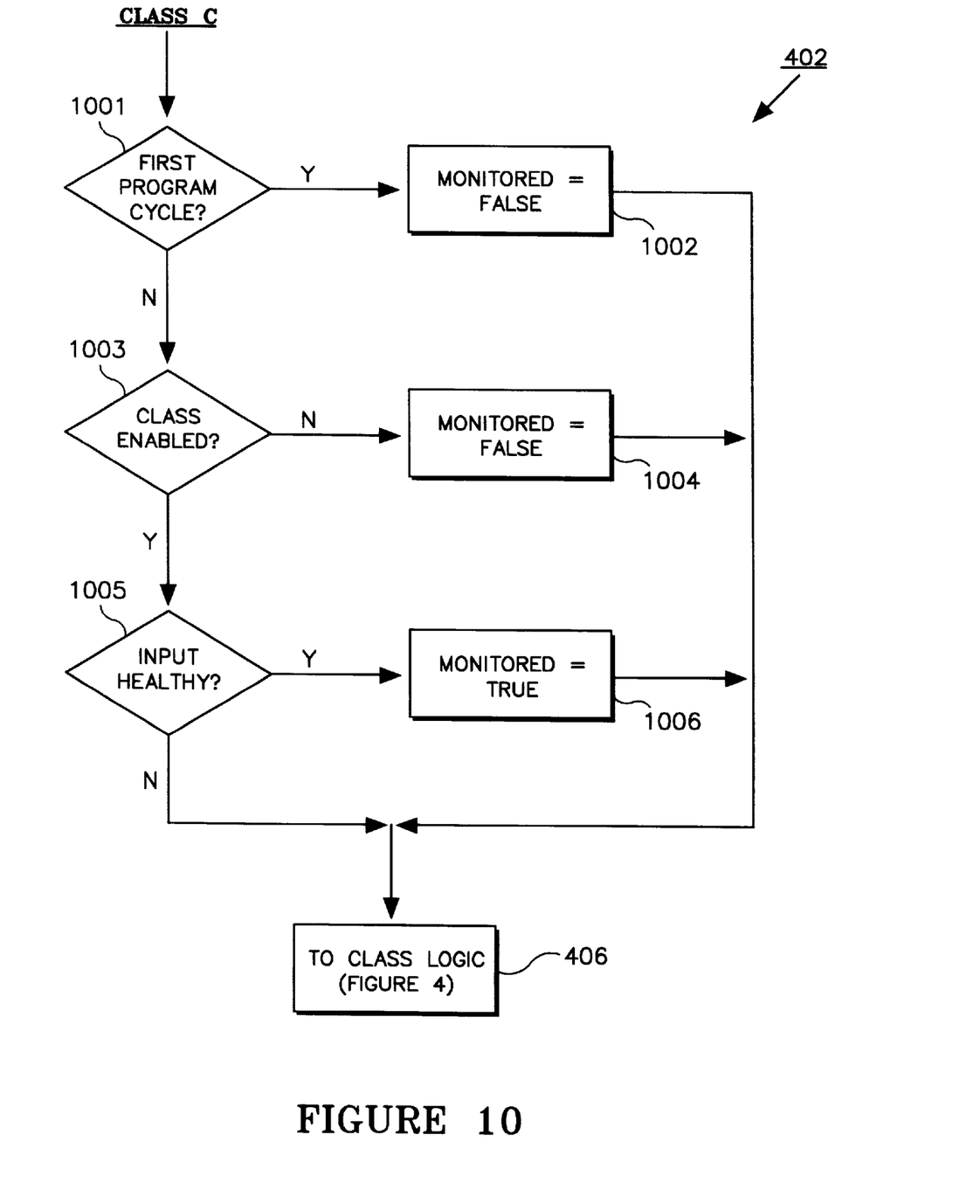
FIG. 10 is a flow diagram of the class logic for a class C input in accordance with the present invention.

Referring now to FIG. 4, there is shown a flow diagram of the class logic portion of a program cycle in accordance with the present invention. Class logic processing begins by accepting the fault value 401 from the input logic, which is the healthy/unhealthy state of the current input. Thereafter, a determination 402 is made whether the input is currently monitored for faults. This decision is made with reference to the class type 403 user parameter, which associates the input with one of the classes (A, B, b, C, or NONE). In addition, if appropriate to the class type, the associated class timer 404 and associated class enable 405 are used in the class logic to determine whether the input is monitored. If the input is class A, the class logic processing is shown in FIG. 7. If the input is class B, the class logic processing is shown in FIG. 8. If the input is class b, the class logic processing is shown in FIG. 9. Finally, if the input is class C, the class logic processing is shown in FIG. 10.

If, in step 402, the input is not found to be monitored, the method is complete 408; otherwise, the method continues by determining 406 whether the input is in fault. As noted earlier, a physical or logical input is considered in fault when it is both unhealthy and monitored. If the input is in fault, the method continues with the alarm/shutdown logic 407 described in FIG. 5; otherwise, the method is complete 408.

Figure 5:
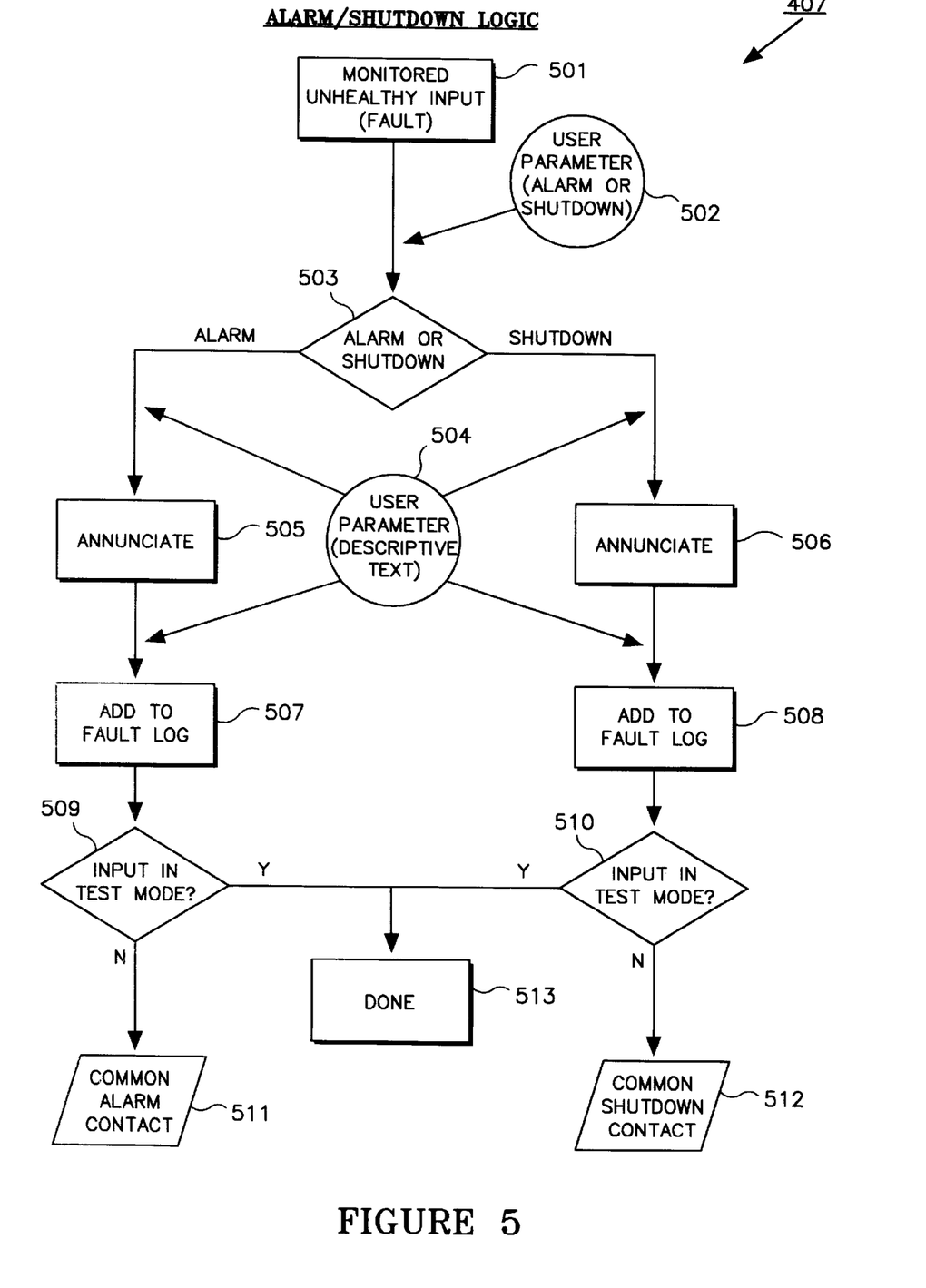
FIG. 5 is a flow diagram of the alarm/shutdown logic portion of a program cycle in accordance with the present invention.

Referring now to FIG. 5, there is shown a flow diagram of the alarm/shutdown logic 407 portion of a program cycle in accordance with the present invention. Processing begins with receiving the monitored unhealthy input 501 (fault). Thereafter, a determination 503 is made whether the input 501 is an alarm or a shutdown, based on the alarm/shutdown 502 user parameter obtained in step 104 or 114. If the input is an alarm, the method continues by annunciating 505 the alarm and adding 507 the alarm to the fault log. The identifying information shown in the annunciation and stored in the fault log is taken from the descriptive text 504 user parameter obtained in step 106 or 116. Thereafter, a determination 509 is made whether the input is in test mode. If so, the method is complete 513. If, however, the input is not in test mode, the corresponding common alarm contact 511 is activated.

If, in step 503, it is determined that the input is a shutdown, the method continues by annunciating 506 the shutdown and adding 508 the shutdown to the fault log. The identifying information shown during the annunciation and stored in the fault log is taken from the descriptive text 504 user parameter obtained in step 106 or 116. Thereafter, a determination 510 is made whether the input is in test mode. If so, the method is complete 513. If, however, the input is not in test mode, the corresponding common shutdown contact 512 contact is activated.

Figure 6:
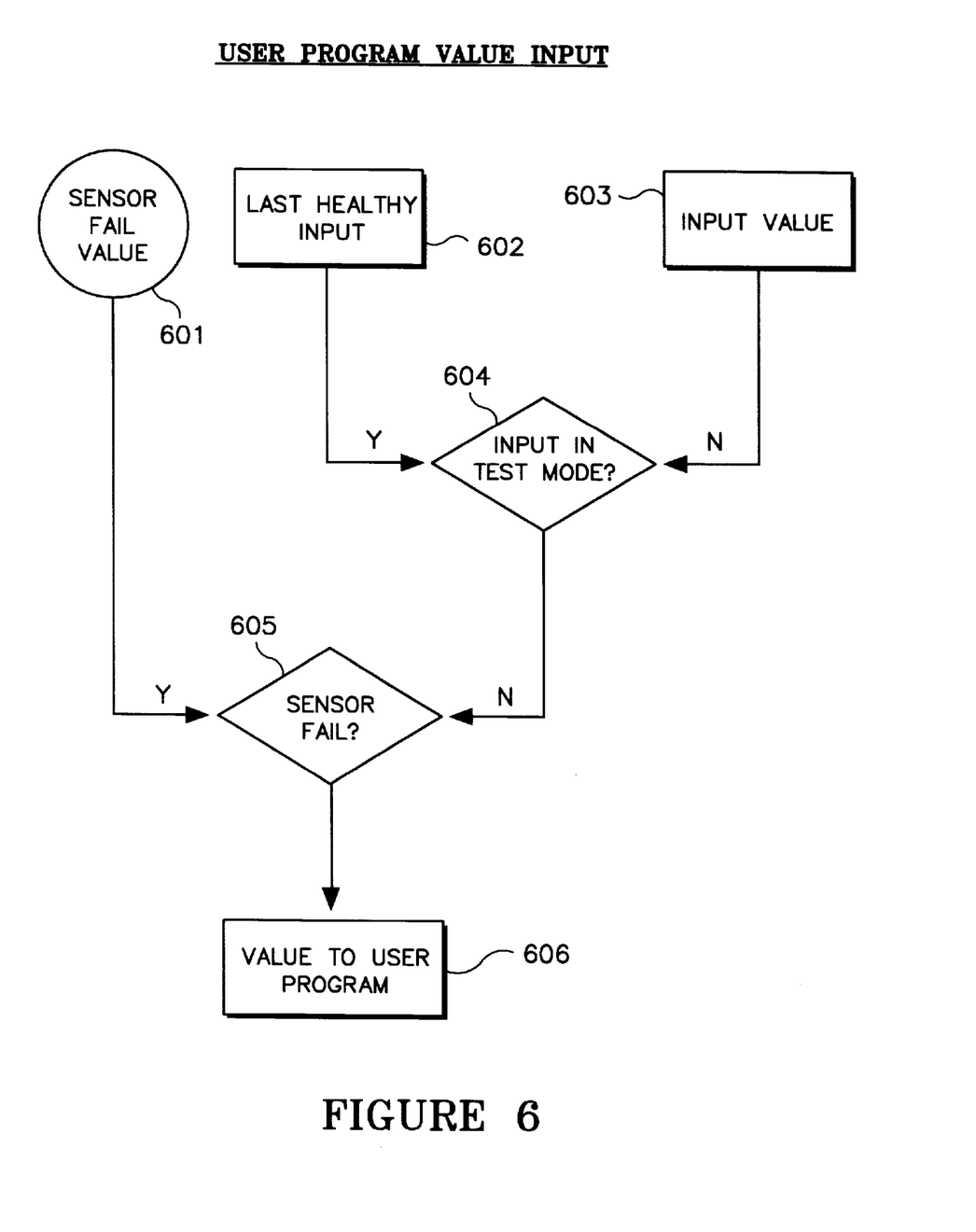
FIG. 6 is a flow diagram of user program value input in accordance with the present invention.

In the case of physical inputs, a value may also be supplied to the analog or logical portion of the user program. Referring now to FIG. 6, there is shown a flow diagram of user program value input in accordance with the present invention. If the input is an analog input and it is in sensor failure 601, the sensor fail value, as obtained in steps 109 and 110, is supplied to the user program 606. Otherwise, if the input is in test mode 604, the last healthy input 602 is supplied to the user program 606. If the input is not in sensor failure 601 and not in test mode 604, then the current scaled value 603 is supplied to the user program 606.

Referring now to FIG. 7, there is shown a flow diagram of the class logic for a class A input in accordance with the present invention. As explained above, if the input is class A, the input is always monitored. Therefore, the monitored flag is set 701 to TRUE, and control returns to step 406 of the class logic.

Referring now to FIG. 8, there is shown is a flow diagram of the class logic for a class B input in accordance with the present invention. As described earlier, a class B input is monitored for faults when the B class has been enabled, and when either the input has gone healthy or when the B timer has timed out, whichever occurs first. Thus, the method begins by determining 801 whether the current program cycle is the first program cycle. If so, the monitored flag is set 802 to FALSE; otherwise, the method continues by determining 803 whether the class is enabled. If the class is not enabled, the monitored flag is set 804 to FALSE; otherwise, a determination 805 is made whether the input is healthy. If the input is healthy, the monitored flag is set 806 to TRUE; otherwise, the method continues by determining 807 whether the B timer has finished. If the B timer has finished, the monitored flag is set 808 to TRUE. If the B timer has not finished, the method is complete, and control returns to step 406 of the class logic. Likewise, after either steps 802, 804, 806, or 808, the method returns to step 406.

Referring now to FIG. 9, there is shown a flow diagram of the class logic for a class b input in accordance with the present invention. As explained earlier, the class b input is monitored for faults when the b class has been enabled and when the b timer has timed out. Thus, the method begins by determining 901 whether the current program cycle is the first program cycle. If so, the monitored flag is set 902 to FALSE; otherwise, the method continues by determining 903 whether the class is enabled. If the class is not enabled, the monitored flag is set 904 to FALSE, otherwise, a determination 905 is made whether the b timer has timed out. If the b timer has timed out, the monitored flag is set 906 to TRUE; otherwise, the method is complete, and control returns to the step 406 of the class logic. Likewise, after either steps 902, 904, or 906, control returns to step 406.

Referring now to FIG. 10, there is shown a flow diagram of the class logic for a class C input in accordance with the present invention. As noted earlier, the class C input is monitored for faults when the C class has been enabled and when the input has gone healthy. Thus, the method begins by determining 1001 whether the current program cycle is the first program cycle. If so, the monitored flag is set 1002 to FALSE; otherwise, the method continues by determining 1003 whether the class is enabled. If the class is not enabled, the monitored flag is set 1004 to FALSE; otherwise, a determination 1005 is made whether the input is healthy. If the input is healthy, the monitored flag is set 1006 to TRUE; otherwise, the method is complete, and control returns to step 406 of the class logic. Likewise, after either steps 1002, 1004, or 1006, control i(i returns to step 406.

What is claimed is:

1. A computer-implemented method for execution in a programmable logic controller, the method comprising:

determining whether a physical input to the programmable logic controller is analog or discrete;

responsive to the physical input being analog, inputting a set of user analog parameters by:

enabling user input of a class type;

enabling user input of an event type;

enabling user input of a scaling value;

enabling user input of a text description; and enabling user input of a setpoint;

responsive to the physical input being discrete, inputting a set of user discrete parameters; and storing the user analog and discrete input parameters in a user parameter data table.

2. The computer-implemented method of claim 1, wherein said class type is selected from a group of class logic types consisting of A, B, b, C, and NONE.

3. The computer-implemented method of claim 1, wherein said event type is selected from a group of events consisting of an alarm and a shutdown.

4. The computer-implemented method of claim 1, wherein at least one setpoint is selected from a group of setpoints consisting of a high setpoint and a low setpoint, the high setpoint indicating an unhealthy state of the physical input greater than the high setpoint, and the low setpoint indicating an unhealthy state of the physical input less than the low setpoint.

5. A computer-implemented method for execution in a programmable logic controller, the method comprising:
   determining whether a physical input to the programmable logic controller is analog or discrete;
   responsive to the physical input being analog, inputting a set of user analog parameters;
   responsive to the physical input being discrete, inputting a set of user discrete parameters by:
   enabling user input of a class type;
   enabling user input of an event type;
   enabling user input of an input contact type; and
   enabling user input of a text description; and
   storing the user analog and discrete input parameters in a user parameter data table.

6. The computer-implemented method of claim 5, wherein said input contact type indicates a polarity of a healthy state.

7. A computer-implemented method for execution in a programmable logic controller, the method comprising:
   determining whether a physical input to the programmable logic controller is analog or discrete;
   responsive to the physical input being analog, inputting a set of user analog parameters;
   responsive to the physical input being discrete, inputting a set of user discrete parameters;
   storing the user analog and discrete input parameters in a user parameter data table;
   enabling user input of a set of user alarm/shutdown parameters by:
   enabling user input of a class type;
   enabling user input of an event type; and
   enabling user input of a text description.

8. A computer-implemented method for execution in a programmable logic controller in response to a set of user-defined parameters, the method comprising:
   reading a physical input of the programmable logic controller;
   responsive to said physical input being discrete, aligning the polarity of the discrete input according to a user input contact type parameter to generate a healthy/unhealthy state;
   responsive to said physical input being analog, scaling the input according to a user input scaling parameter and comparing the scaled input to at least one user input setpoint parameter to generate a healthy/unhealthy state;
   determining whether said physical input is in fault by processing the physical input using embedded class logic for the user input class; and responsive to said physical input being in fault, performing an operation from a group of operations consisting of an alarm and a shutdown according to a user alarm/shutdown parameter.

9. The comput&r-implemented method of claim 8, wherein the step of performing said alarm comprises:
   annunciating the alarm with a user input text description parameter; and
   responsive to the physical input not being in test mode,
   adding the alarm with the user input text description parameter to a fault log; and
   activating a common alarm contact.

10. The computer-implemented method of claim 8, wherein the step of performing said shutdown comprises:
   annunciating the shutdown with a user input text description parameter; and
   responsive to the input not being in test mode,
   adding the shutdown with the user input text description parameter to a fault log; and
   activating a common shutdown contact.

11. The computer-implemented method of claim 8, wherein a class type is selected from a group of class logic types consisting of A, B, b, C, and NONE.

12. A computer-readable medium having computer-readable code embodied therein for execution in a programmable logic controller, the computer-readable medium comprising:
   computer-readable program code modules configured to determine whether a physical input is analog or discrete;
   computer-readable program code modules configured to, responsive to the physical input being analog, enable user input of a set of analog parameters;
   said computer-readable program code modules configured to enable user input of the set of analog parameters further comprises:
   computer-readable program code modules configured to enable user input of a class type;
   computer-readable program code modules configured to enable user input of an event type;
   computer-readable program code modules configured to enable user input of at least one scaling value;
   computer-readable program code modules configured to enable user input of a text description; and
   computer-readable program code modules configured to enable user input of at least one setpoint; and
   computer-readable program code modules configured to, responsive to the physical input being discrete, enable user input of a set of discrete parameters; and
   computer-readable program code modules configured to store the user analog and discrete input parameters in a user parameter data table.

13. A computer-readable medium having computer-readable code embodied therein for execution in a programmable logic controller, the computer-readable medium comprising:
   computer-readable program code modules configured to determine whether a physical input is analog or discrete;
   computer-readable program code modules configured to, responsive to the physical input being analog, enable user input of a set of analog parameters;
   computer-readable program code modules configured to, responsive to the physical input being discrete, enable user input of a set of discrete parameters;
   said computer-readable program code modules configured to enable user input of the set of discrete parameters further comprises:
   computer-readable program code modules configured to enable user input of a class type;
   computer-readable program code modules configured to enable user input of an event type;
   computer-readable program code modules configured to enable user input of an input contact type;
   computer-readable program code modules configured to enable user input of a text description; and
   computer-readable program code modules configured to store the user analog and discrete input parameters in a user parameter data table.

* * * * *